June 10, 1930.  H. H. MORETON  1,762,877
LAMP FOR MOTOR VEHICLES
Filed Feb. 2, 1928  2 Sheets-Sheet 1
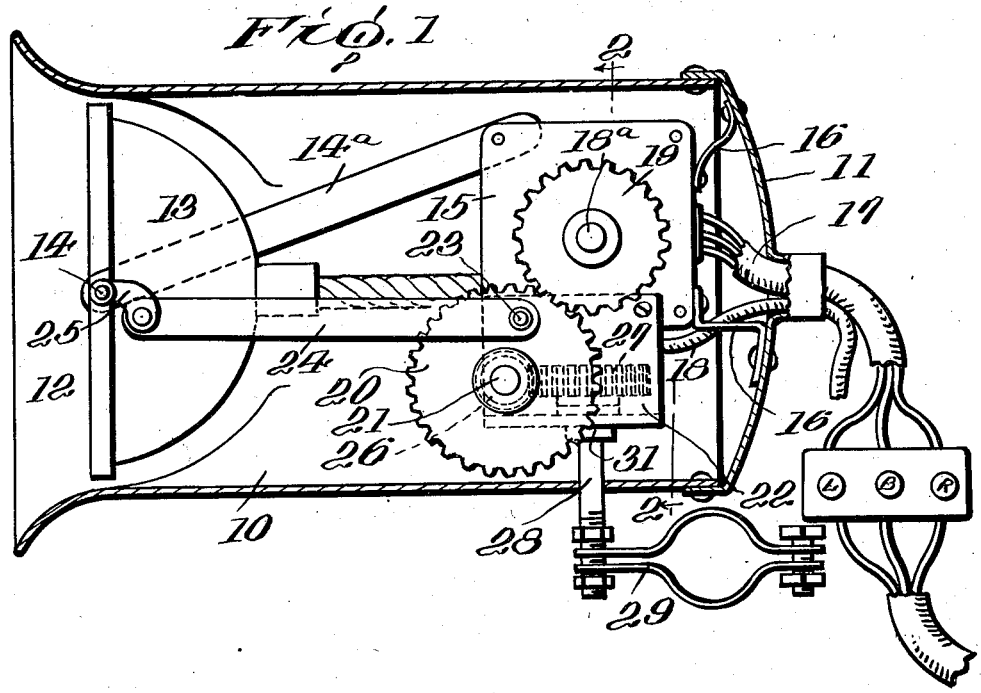
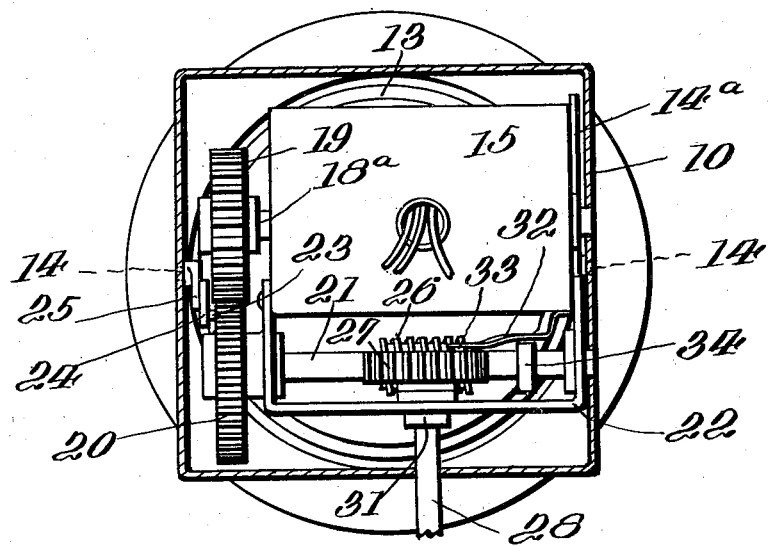
Inventor
Henry H. Moreton
By Wm. S. Hodges
Attorney June 10, 1930. H. H. MORETON 1,762,877
LAMP FOR MOTOR VEHICLES
Filed Feb. 2, 1928 2 Sheets-Sheet 2
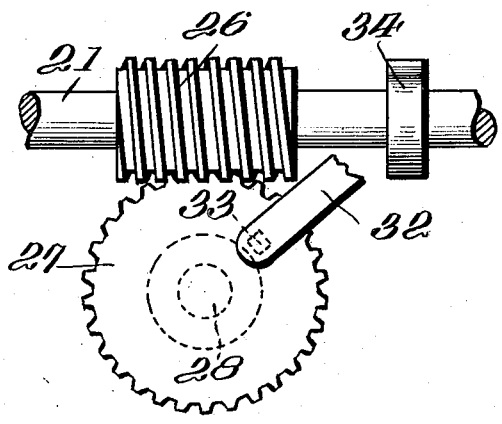
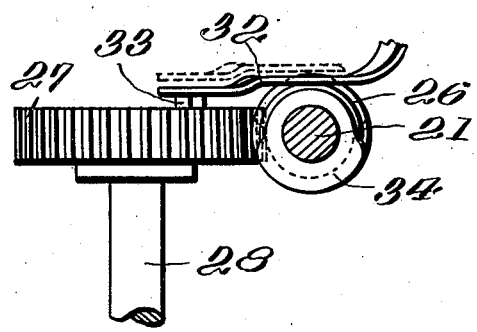
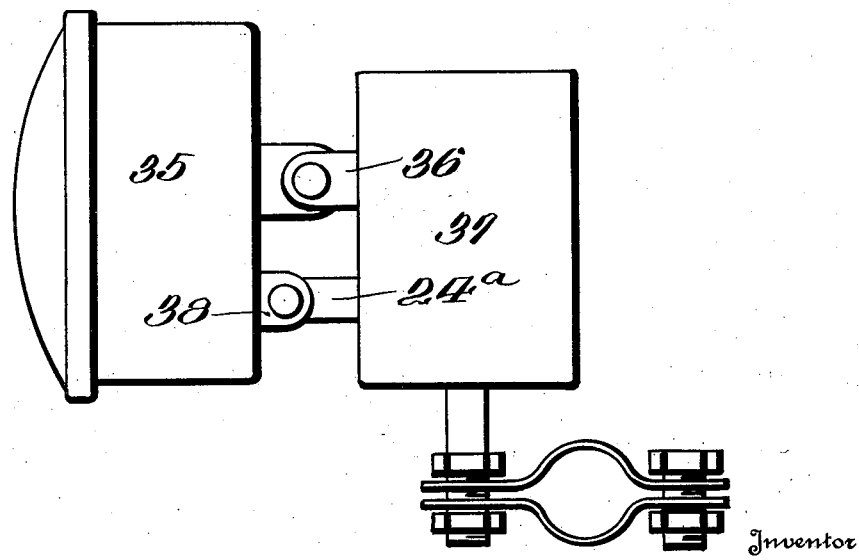
Inventor
Henry H. Moreton
By Wm. S. Hodges
Attorney Patented June 10, 1930

1,762,877

UNITED STATES PATENT OFFICE

HENRY H. MORETON, OF SANTA MONICA, CALIFORNIA

LAMP FOR MOTOR VEHICLES

Application filed February 2, 1928. Serial No. 251,418.

This invention is an apparatus for imparting various movements to a spot light lamp of the type commonly employed on motor vehicles, but is not limited to this particular type of lamps.

One of the objects of the invention is to provide means of simple construction for rocking a lamp on a horizontal axis, so as to direct a forwardly projected beam of light both upwardly and downwardly. A further object is to provide means for also imparting lateral movements to the lamp, so that the beam of light may be projected to either side of the vehicle as well as forwardly. A further object is to provide means by which the up and down movements and the lateral movements may take place simultaneously. A further object is to provide means for automatically cutting off the circuit to the lamp while it is being moved through a predetermined portion of the arc of its vertical movement, so as to prevent the beam from being directed into the eyes of the driver of an approaching vehicle. A further object is to so construct the said circuit control means that it will be unaffected by those movements of the lamp which are required to direct the beam laterally with respect to the vehicle on which it is mounted.

The invention will be hereinafter fully set forth and particularly pointed out in the claims.

In the accompanying drawing:—

Figure 1 is a longitudinal sectional view illustrating a casing with the invention applied thereto. Figure 2 is a transverse sectional view on the line 2—2. Figures 3 and 4 are detail views illustrating the automatic cut-out device for the lamp. Figure 5 is a side elevation illustrating a slight modification of the lamp-supporting means.

Referring to the drawings, 10 designates a cylindrical casing constructed of any desired material, said casing being closed at one end by a wall 11, and open at its other end 12. The lamp 13 which is conventionally illustrated, may be of any desired construction, preferably provided with the usual parabolic reflector and a focussed electric illuminating element therein. Said reflector is provided with trunnions 14, by means of which it is pivotally mounted in the forward ends of supporting arms 14ª, in a position adjacent to the open end 12, so as to project a beam of light outwardly through said opening. The rear ends of said arms are secured to a motor casing 15, which is secured to brackets 16 rigidly secured to the rear wall 11.

Said casing 15 encloses an electric motor controlled by circuit wires leading through a cable 17. Push buttons R and L are connected with these wires in a well known manner to control forward and reverse rotations of said motor. Another push button B is also located adjacent the other push buttons and is connected with the cable 18 leading from the lamp 13, so as to open or close the circuit to said lamp.

Secured to the motor shaft 18ª is a pinion 19, which meshes with a gear 20, secured to a shaft 21 mounted in suitable bearings provided by a bracket 22 depending from the motor casing 15. Said gear 20 is provided with a crank pin 23, to which is connected one end of a pitman 24, the other end of which is connected to a finger 25, carried by one of the trunnions 14. The shaft 21 is provided with a worm 26 meshing with a worm wheel 27 fixedly secured to a shaft 28 which is rigidly held in a bracket 29. Said bracket may be of any of the well known forms for attaching a spotlight to a motor vehicle. As shown it is constructed of two clamping members shaped to engage a portion of the vehicle body, the clamping pressure being applied by means of suitable nuts in a manner well understood in the art. The weight of the casing 10 is carried by the bracket 22, which rests upon a collar 31 secured to shaft 28.

In operation, while either of the push buttons R or L is depressed, the motor shaft 18ª is rotated in the direction indicated by the button which may have been selected, and as said shaft is rotated, the gear 20 is also rotated, and through the pitman connection movement is imparted to the reflector casing on a horizontal axis represented by the trunnions 14. At the same time the coaction between the shaft 21 and the worm wheel 27 is such that the said shaft will travel in an orbit about said worm wheel, carrying with it the bracket 22, the motor casing 15, and the driving mechanism between the motor and the shaft 21, and the casing 10, thereby moving the parts to a position to direct the beam laterally. The reverse action takes place upon the operation of the other push button controlling the motor. It will be understood, of course that while the casing 10 is moving to the right or left, as the case may be, the lamp 13 is also being moved up and down, as previously described. The gear ratio is such that the last mentioned movement of the lamp is much faster than the lateral movement of the casing 10. Movement of the lamp is arrested as soon as the push button is released, and if the lamp has travelled too far, a touch on the other button will move it backwardly a distance determined by the period that said button remains depressed.

It is desirable to cut off the circuit to the lamp when the beam is projected in a direction and at a level that would direct it into the eyes of the driver of an approaching vehicle. For this purpose, a simple form of cut-out device is employed, consisting of two contacts 32, 33 included in the lamp circuit and mounted on the top of the stationary worm wheel 26. The contact 32 is provided with a portion which overlies and normally engages the contact 33, and projects over the top of the worm shaft 21. Said shaft is provided with a cam portion 34, which is positioned to engage and raise the contact 32 while the casing 10 is positioned to project the light beam directly forward. As the shaft travels about the worm wheel 26, the cam portion will be moved to a position that will prevent it from engaging with the contact 32 and said contact will spring back into engagement with the contact 33. It will be understood that the location of the dark zone established during the travel of the lamp may be changed by grouping the contacts 32 and 33 in different positions on the wheel 26, so as to vary the distance the worm shaft 21 will have to travel in its orbit about the worm wheel 26 before it will engage with the contact 32.

In the modification illustrated in Figure 5, the reflector casing of the lamp 35 is pivotally supported by a bracket 36, secured to a casing 37, in which is mounted the motor casing and its cooperating parts. The pitman 24ª is connected at its forward end to a lug 38 projecting rearwardly from the casing 35. The movement producing mechanism is the same as that already described and operates in the same manner.

The advantages of the invention will be readily apparent to those skilled in the art to which it belongs. For instance, it will be noted that up and down and right and left movements may be imparted to the lamp in a manner to project the beam of the lamp in corresponding directions, and that these movements may be effected by merely pressing a push button, thus avoiding awkward manual manipulation. A further important advantage is that the beam of light is automatically cut off when it is projected in a direction that will tend to blind the driver of an approaching vehicle. This is of particular importance in view of the laws now in force in one or more States which prohibit the use of spotlights unless they are equipped with means for positively preventing the directing of the beam into the eyes of an approaching driver.

Having thus explained the nature of the invention and described an operative manner of constructing and using the same, although without attempting to set forth all of the forms in which it may be made, or all of the forms of its use, what is claimed is:—

1. A lamp of the character described comprising a casing, a lamp pivotally mounted within said casing on an axis extending transversely of the casing, and motor operated means also within the casing for moving said casing on an axis at right angles to the axis of pivotal movement of said lamp.

2. A lamp of the character described comprising a supporting casing, a lamp pivotally mounted therein, a motor mounted in said casing, means operated by said motor for rocking said lamp on its pivotal axis, and means also operated by said motor for moving said casing on an axis at right angles to the axis of movement of said lamp.

3. A lamp of the character described comprising a supporting casing, a lamp pivotally mounted therein, a motor, a drive shaft operated by said motor, means connected to said drive shaft for rocking said lamp on its pivotal axis, and means cooperating with said shaft for simultaneously moving said casing on an axis at right angles to the axis of movement of said lamp.

4. A lamp of the character described comprising a supporting casing, a lamp pivotally mounted therein, a motor, a gear wheel operated by said motor, means operated by said gear wheel for rocking said lamp on its axis, and other means cooperating with said gear wheel for simultaneously effecting pivotal movement of the casing on an axis at right angles to the axis of rotation of said lamp.

5. A lamp of the character described comprising a supporting casing, a lamp pivotally mounted therein, a motor, a gear wheel operated by said motor, a finger connected to said lamp, a pitman connecting said gear wheel and said finger so that the lamp will be rocked on its pivotal axis, and means cooperating with said gear wheel for simultaneously imparting pivotal movement to the casing on an axis at right angles to the axis of movement of said lamp.

6. A lamp of the character described comprising a casing, a lamp pivotally supported by said casing, a fixed member located within said casing on an axis at right angles to the axis of movement of said lamp, means cooperating with said fixed member to impart movement to said casing about said member as an axis, and a common means for moving the casing and simultaneously and independently rocking the lamp on its axis.

7. A lamp of the character described comprising a casing, a lamp pivotally supported by said casing, a fixed shaft located within said casing at right angles to the axis of movement of the lamp and having a stationary gear wheel, a shaft supported by said casing and having a complemental member meshing with said gear wheel so as to travel in an orbit about the same, and a common means for moving the casing and simultaneously and independently rocking said lamp on its axis.

8. A lamp of the character described comprising a casing, a lamp pivotally supported by said casing, a fixed shaft projecting into said casing at right angles to the axis of movement of said lamp, a gear wheel fixed to said shaft, a shaft rotatably supported by said casing and having complemental means reacting with said gear wheel so that rotation of said last mentioned shaft will cause it to travel in an orbit about said wheel, and means for actuating said rotatable shaft and simultaneously rocking said lamp on its axis.

9. A lamp of the character described comprising a casing, a lamp pivotally supported within said casing, a fixed gear located within said casing on an axis at right angles to the axis of movement of said lamp, a shaft supported by said casing and having complemental means reacting with said gear wheel so that rotation of said shaft will cause it to travel in an orbit around said wheel, a gear wheel for driving said shaft, means for rotating said gear wheel, and means operated by the last mentioned gear wheel for rocking said lamp on its axis.

10. A lamp of the character described comprising a casing, a lamp pivotally supported by said casing, a fixed shaft extending into said casing at right angles to the axis of movement of said lamp, a worm wheel fast on said shaft, a worm shaft supported by said casing and engaging said worm wheel so that rotation of the worm shaft will cause it to move in an orbit about said worm wheel and impart corresponding pivotal movement to said casing, a gear wheel secured to one end of said shaft to drive the same, means for operating the gear wheel, and means operated by the gear wheel for also imparting movement to said lamp on its axis.

11. A lamp of the character described comprising a casing, a lamp pivotally mounted within said casing, motor operated means also mounted within said casing for moving it on an axis at right angles to the axis of movement of said lamp, and means for temporarily breaking the circuit to said lamp during a portion of the arc of movement thereof on its pivotal axis.

12. A lamp of the character described comprising a supporting casing, a lamp pivotally mounted therein, a motor mounted in said casing, means operated by said motor for rocking said lamp on its pivotal axis, means also operated by said motor for moving said casing on an axis at right angles to the axis of movement of said lamp, and means controlled by the casing-moving means for temporarily breaking the circuit to said lamp during a portion of the movement thereof on its pivotal axis.

13. A lamp of the character described comprising a casing, a lamp pivotally supported by said casing, a fixed member located within said casing on an axis at right angles to the axis of movement of said lamp, motor driven means cooperating with said fixed member to impart movement to said casing about said member as an axis, means for simultaneously and independently rocking the lamp on its axis, contacts controlling the circuit to the lamp, and means operated by the casing-moving means for temporarily breaking the circuit at said contacts.

14. A lamp of the character described comprising a casing, a lamp pivotally supported by said casing, a fixed shaft projected into said casing at right angles to the axis of movement of said lamp, a gear wheel fixed to said shaft, a shaft supported by said casing and having complemental means reacting with said gear wheel so that rotation of said shaft will cause it to travel in an orbit about said wheel, means for rotating said shaft and simultaneously rocking said lamp on its axis, normally closed contacts carried by said fixed shaft and controlling the circuit to said lamp, and means carried by the last mentioned shaft for temporarily breaking the circuit at said contacts.

15. A lamp of the character described comprising a casing, a lamp pivotally supported by said casing, a fixed shaft extending into said casing at right angles to the axis of movement of said lamp, a worm wheel fast on said shaft, a worm shaft supported by said casing and engaging said worm wheel so that rotation of the worm shaft will cause it to move in an orbit about said worm wheel and impart corresponding pivotal movement to said casing to drive the same, means for operating the gear wheel, means operated by the gear wheel for also imparting movement to said lamp on its axis, contacts on said worm wheel and controlling the circuit to said lamp, and means on said worm shaft for temporarily breaking the circuit at said contacts.

16. A lamp of the character described comprising a casing, a lamp pivotally supported by said casing, a fixed shaft extending into said casing at right angles to the axis of movement of said lamp, a worm wheel fast on said shaft, a worm shaft supported by said casing and engaging said worm wheel so that rotation of the worm shaft will cause it to move in an orbit about said worm wheel and impart corresponding pivotal movement to said casing, a gear wheel secured to one end of said shaft to drive the same, means for operating the gear wheel, means operated by the gear wheel for also imparting movement to said lamp on its axis, contacts on said worm wheel and controlling the circuit to said lamp, one of said contacts overlying and normally engaging the other and also having a portion positioned to project over said worm shaft, and a cam on said worm shaft positioned to engage said contact.

In testimony whereof I have hereunto set my hand.

HENRY H. MORETON.